(12) United States Patent
Cheng et al.

(10) Patent No.: US 7,740,394 B2
(45) Date of Patent: Jun. 22, 2010

(54) BACKLIGHT MODULE HAVING TWO OPTICAL SHEETS

(75) Inventors: Wen-Feng Cheng, Taoyuan County (TW); Chao-Ying Lin, Taoyuan County (TW); Chen-Sheng Lee, Taoyuan County (TW)

(73) Assignee: Entire Technology Co., Ltd., Taoyuan County (TW)

( * ) Notice: Subject to any disclaimer, the term of this patent is extended or adjusted under 35 U.S.C. 154(b) by 265 days.

(21) Appl. No.: 11/936,814

(22) Filed: Nov. 8, 2007

(65) Prior Publication Data
US 2009/0122537 A1 May 14, 2009

(51) Int. Cl.
*G09F 13/08* (2006.01)
*G09F 13/10* (2006.01)
*F21V 7/04* (2006.01)

(52) U.S. Cl. .................. 362/634; 362/632; 362/633; 362/97.1; 362/97.4; 349/58

(58) Field of Classification Search ......... 362/600–634, 362/97.1–97.4; 349/58–70
See application file for complete search history.

(56) References Cited

U.S. PATENT DOCUMENTS

| 7,163,319 | B2* | 1/2007 | Kuo et al. | 362/97.2 |
| 7,510,317 | B2* | 3/2009 | Murakami et al. | 362/634 |
| 2007/0019419 | A1* | 1/2007 | Hafuka et al. | 362/612 |
| 2007/0201246 | A1* | 8/2007 | Yeo et al. | 362/627 |

\* cited by examiner

*Primary Examiner*—Sandra L O'Shea
*Assistant Examiner*—William J Carter
(74) *Attorney, Agent, or Firm*—Alan Kamrath; Kamrath & Associates PA

(57) ABSTRACT

A backlight includes a case, pluralities of light sources, pluralities of needles, pluralities of supporting portions, a first optical sheet, a second optical sheet, and pluralities of first microstructures. The light sources are disposed inside the case, the needles are disposed on the bottom surface of the case, and the supporting portions are disposed on the needles. The first optical sheet is supported on the top of the needles. The second optical sheet placed under the first optical sheet has pluralities of holes, and the needles penetrate the holes. The second optical sheet is supported on the supporting portions. The first microstructures are disposed on the first optical sheet or on the second optical sheet to provide a light condensing function.

9 Claims, 5 Drawing Sheets

BACKLIGHT MODULE HAVING TWO OPTICAL SHEETS

BACKGROUND OF THE INVENTION

1. Field of the Invention

The present invention relates to a backlight module and particularly to a backlight module which has two optical sheets.

2. Description of the Prior Art

In recent years, the traditional cathode ray tube display (commonly called CRT display) has been gradually replaced by a liquid crystal display (LCD). The main reason is that the LCD releases far less radiation than the CRT display. Moreover, the production cost of the LCD has dropped significantly in recent years. In general, the LCD includes a backlight module and a liquid crystal panel. The backlight module mainly aims to provide a light source for the LCD.

Refer to FIG. 1 for a conventional backlight module 100 which includes a case 110, a cold cathode fluorescent lamp (CCFL) 120, a diffusion plate 130, an optical film 140 and a plurality of needles 150. The CCFL 120 is located in the case 110 which has a reflective sheet (not shown in the drawing) on the inside surface to use light generated by the CCFL 120 more effectively. The diffusion plate 130 mainly diffuses the light generated by the CCFL 120 so that the light can be projected more evenly to the liquid crystal panel (not shown in the drawing) without creating uneven luminosity on the display of the LCD. The needles 150 aim to support the diffusion plate 130 to prevent it from warping due to its own weight.

In addition, the optical film 140 further includes a brightness enhancement film (BEF) 144. As the diffusion plate 130 cannot fully overcome the uneven luminosity, a diffusion film 142 is added to evenly diffuse the light. Moreover, light exited from the diffusion film 142 has a greater light exit angle. Hence, the BEF 144 is disposed on the diffusion film 142. The BEF 144 has a thickness about 0.062 mm to 0.375 mm and a plurality of prism structures 144a formed at an upper side thereof to converge light. Thus, the exit angle of the light emitting from the BEF 144 becomes smaller. Therefore, the luminosity within the visual angle of the backlight module 100 is enhanced.

Due to manufacturing process and material, the BEF 144 often is the most expensive item in the backlight module 100. In order to reduce the total cost of the backlight module 100, some producers use a less expensive prism plate to replace the BEF 144. However, the prism plate is thicker and, thus, the total thickness of the backlight module 100 also becomes thicker. Hence, how to use the prism plate without increasing the thickness of the backlight module 100 is an issue remained to be resolved in the industry.

SUMMARY OF THE INVENTION

It is an object of the present invention to provide a backlight module that has two optical sheets without increasing the total thickness of the backlight module.

The backlight module according to the invention includes a case, a plurality of light sources, a plurality of needles, a plurality of supporting portions, a first optical sheet, a second optical sheet and a plurality of first microstructures. The light sources are located in the case. The needles are mounted onto the bottom surface of the case. The supporting portions are located on the needles. The first optical sheet is held at the top of the needles. The second optical sheet is located beneath the first optical sheet and has a plurality of holes run through by the needles. The second optical sheet is also held by the supporting portions. The first microstructures are located on the first optical sheet or the second optical sheet and provide a light converging function.

In one aspect of the backlight module, the needles and the supporting portions have a reflective material coated on the surfaces thereof.

In another aspect, the needles and the supporting portions are made from transparent material.

In yet another aspect, the backlight module further includes a plurality of latch elements to run through side walls of the case with one end pressing an upper surface of the second optical sheet.

In yet another aspect, each needle has a stem and a needle head. The supporting portions are located on the stem. The needle head is flexible and has a bottom spaced from the supporting portions at a distance which is the same as the thickness of the second optical sheet. When the needle does not receive an external force, the needle head has an outside diameter greater than the inner diameter of the holes of the second optical sheet. Moreover, the needle head further includes a holding plate and a plurality of warping blades. The warping blades bridge the holding plate and the stem.

In yet another aspect, the first microstructures are located on the first optical sheet. The first optical sheet is formed at a thickness greater than 0.5 mm with a penetrative rate at 90% or more. The second optical sheet is formed at a thickness greater than 0.5 mm with a penetrative rate between 50%-70%. The first microstructures are prisms.

In yet another aspect, the backlight module according to the invention includes a case, a plurality of light sources, a plurality of needles, a first optical sheet, a second optical sheet and a plurality of first microstructures. The light sources are located in the case. The needles are mounted on the bottom surface of the case and have respectively a conical surface. The first optical sheet is held at the top of the needles. The second optical sheet is located beneath the first optical sheet and has a plurality of holes run through by the needles. The second optical sheet is held by the conical surface of the needles. The first microstructures are located on the first optical sheet or the second optical sheet and provide a light converging function. The needles and the holes are coupled in a compact manner.

Due to the backlight module of the invention having two optical sheets, due to the second optical sheet having a plurality of holes run through by the needles, and since the second optical sheet is located in a lower chamber of the backlight module, the total thickness of the backlight module does not increase even containing the two optical sheets.

The foregoing, as well as additional objects, features and advantages of the invention, will be more readily apparent from the following detailed description, which proceeds with reference to the accompanying drawings.

DESCRIPTION OF THE PREFERRED EMBODIMENTS

Figure 2:
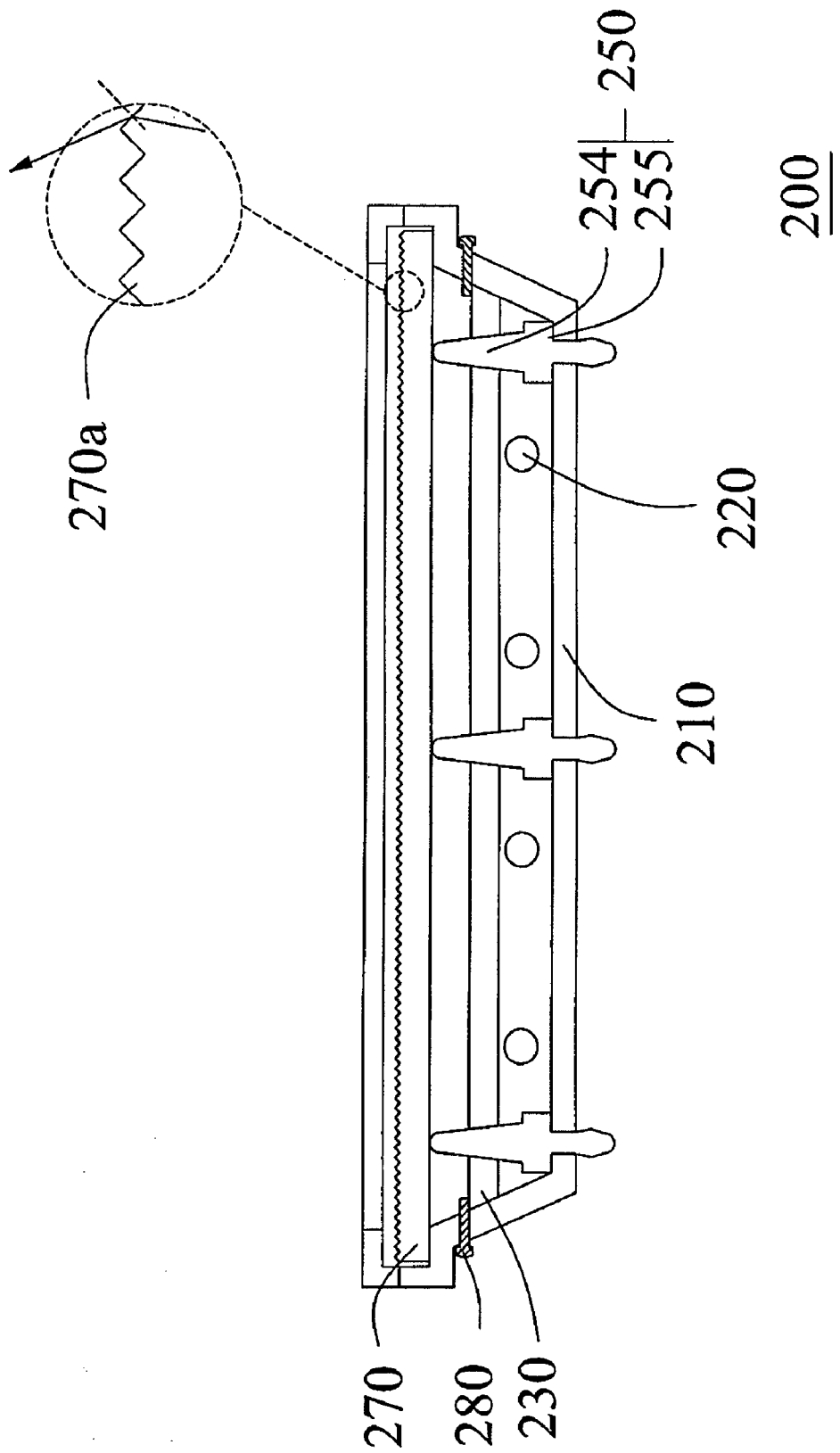
FIG. 2 is a schematic view of a first embodiment of the backlight module of the invention.
Figure 3:
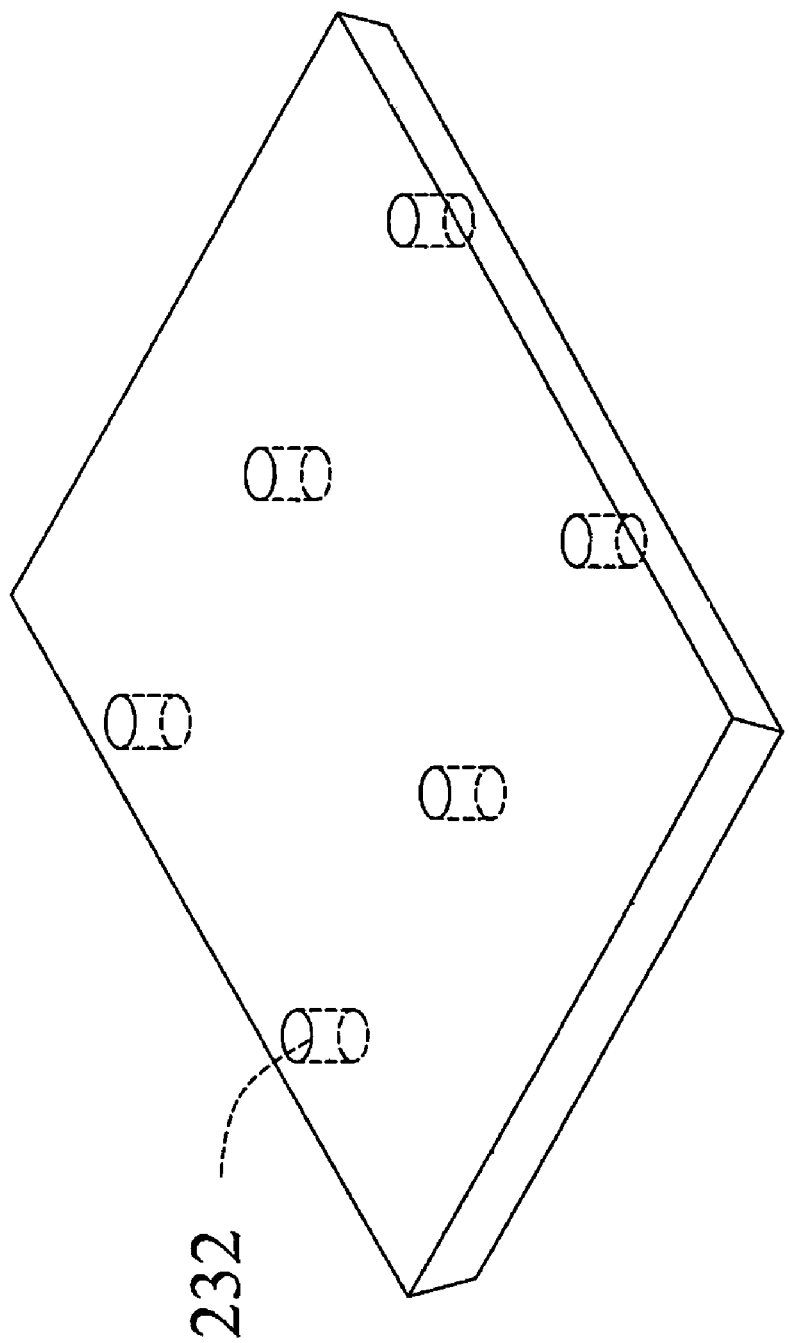
FIG. 3 is a schematic view of a second optical sheet of the backlight module.

Please refer to FIGS. 2 and 3 for a first embodiment of the backlight module and the second optical sheet of the invention. The backlight module 200 includes a case 210, a plurality of light sources 220, a first optical sheet 270, a second optical sheet 230 and a plurality of needles 250. The light sources 220 are CCFLs and located in the case 210. Of course to those skilled in the art, the CCFLs may also be substituted by light emitting diodes. In this embodiment, the needles 250 are mounted onto the bottom surface of the case 210. Each needle 250 has a stem 254 and a base 255. The stem 254 is conical. The first optical sheet 270 is held at the top of the needles 250 and has a plurality of first microstructures 270a formed thereon that are prisms to provide a light converging function. Of course to those skilled in the art, the first microstructures 270a may also adopt other designs to provide the light converging function, such as a conical shape.

Figure 1:
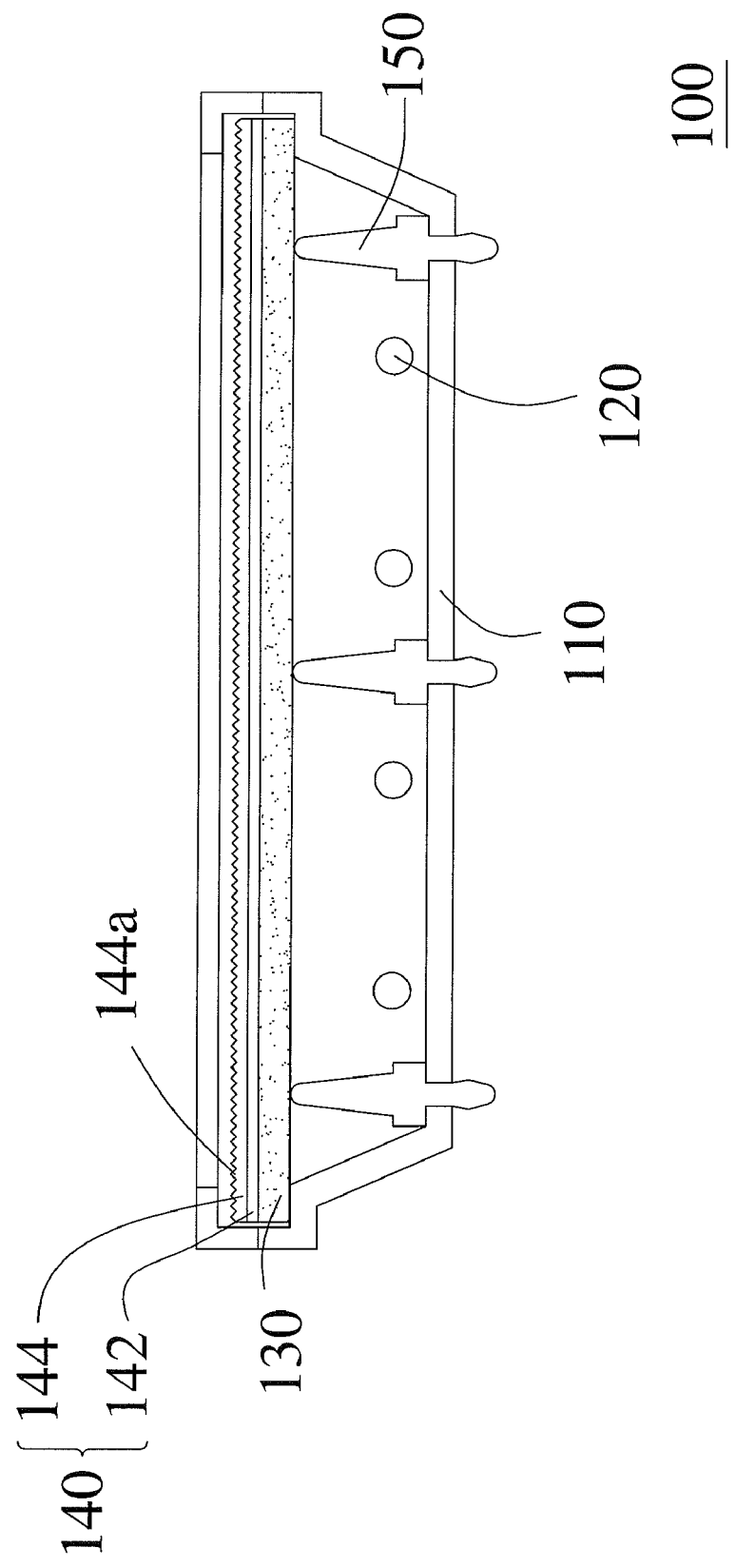
FIG. 1 is a schematic view of a conventional backlight module.

Referring to FIGS. 2 and 3, the second optical sheet 230 has a plurality of holes 232. Each hole 232 has a conical or cylindrical surface to mate with the stem 254 of the needles 250 to form a compact coupling. As shown in FIG. 2, the second optical sheet 230 is rested on the conical surface of the stem 254 of the needles 250 and held in a lower chamber 202 (not shown in FIG. 2) of the backlight module 200. Hence, compared with the backlight module 100 shown in FIG. 1, even if the backlight module 200 contains the second optical sheet 230, the total thickness thereof does not increase. Moreover, as the hole 232 and the stem 254 form a compact coupling, the second optical sheet 230 does not loosen off even if the backlight module 200 is moved at different positions such as in an upright or upside down position. In addition, a plurality of latch elements 280 may be provided at lateral sides of the backlight module 200. The latch elements 280 run through side walls of the case 210 to press an upper surface of the second optical sheet 230 to hold the second optical sheet 230 more firmly. Of course to those skilled in the art, the latch elements 280 may also be dispensed with, according to actual conditions.

The first optical sheet 270 and the second optical sheet 230 are made from transparent material and are blended with multiple light diffusion particles. The refractive index of the light diffusion particles is different from the transparent material. Hence, when the light passes through the first optical sheet 270 and the second optical sheet 230, it passes through the two media of different refractive indices to generate refraction, reflection and scattering to diffuse the light. The number of the light diffusion particles in the second optical sheet 230 is greater than the first optical sheet 270 and, thus, the second optical sheet 230 has a lower penetration rate. The transparent material may be selected from Polymethyl Methacrylate (PMMA), Polycarbonate (PC), Polystyrene (PS), Methyl Methacrylate Styrene (MS), Polypropene (PP), Polythylene (PE), or Polythylene terephthalate (PET). Moreover, the first optical sheet 270 may include no light diffusion particles. In this embodiment, an optical measurement instrument (model No. NDH2000) produced by Japan KEISOKU GIKEN is used to measure the penetration rate of the first optical sheet 270 and the second optical sheet 230. The first optical sheet 270 and the second optical sheet 230 may also be formed by extruding.

Referring to FIG. 2, as the first optical sheet 270 and the second optical sheet 230 are spaced at a distance, light can be fully mixed in the space. In the event that the first optical sheet 270 contains a smaller amount of the light diffusion particles, the light can be further diffused. Hence, the light can be evenly diffused even without including a diffusion film 142 in the backlight module 200. As a result, the total cost of the backlight module 200 can be reduced.

In the embodiment set forth above, the first microstructures 270a are formed on the first optical sheet 270. To those skilled in the art, the first microstructures 270a may also be formed on the second optical sheet 230. Moreover, besides the light exit surface of the first microstructures 270a, the microstructures may also be formed at other locations, such as a light incident surface of the first optical sheet 270, a light exit surface of the second optical sheet 230 or a light incident surface of the second optical sheet 230. In addition, in the embodiment set forth above, the first optical sheet 270 has a greater penetration rate, while the second optical sheet 230 has a lower penetration rate. To those skilled in the art, the aforesaid condition may be altered by having a higher penetration rate for the second optical sheet 230.

In the first embodiment, the holes 232 and the stem 254 are coupled in a compact manner to anchor the second optical sheet 230. Of course to those skilled in the art, other means may also be used to anchor the second optical sheet 230 as shown in a second embodiment discussed below.

Figure 4:
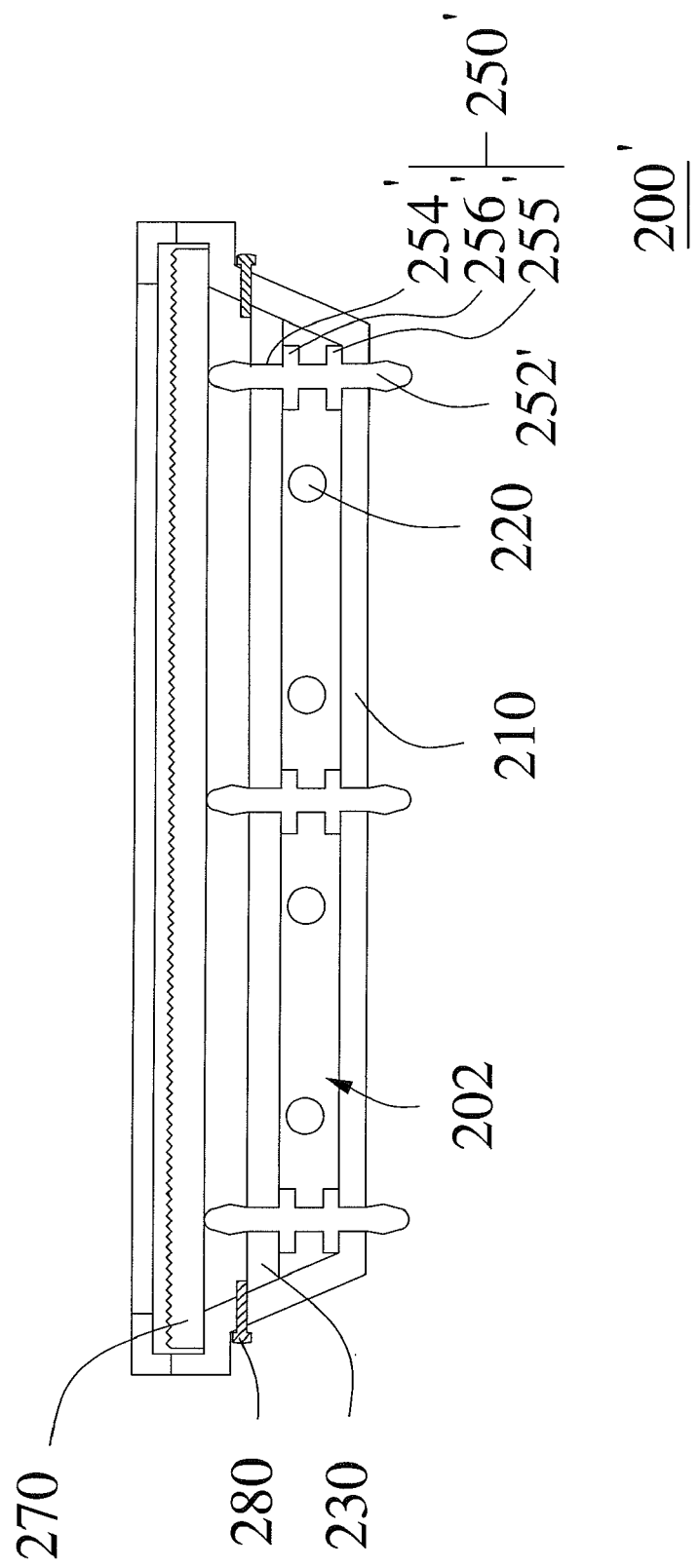
FIG. 4 is a schematic view of a second embodiment of the backlight module of the invention.
Figure 5:
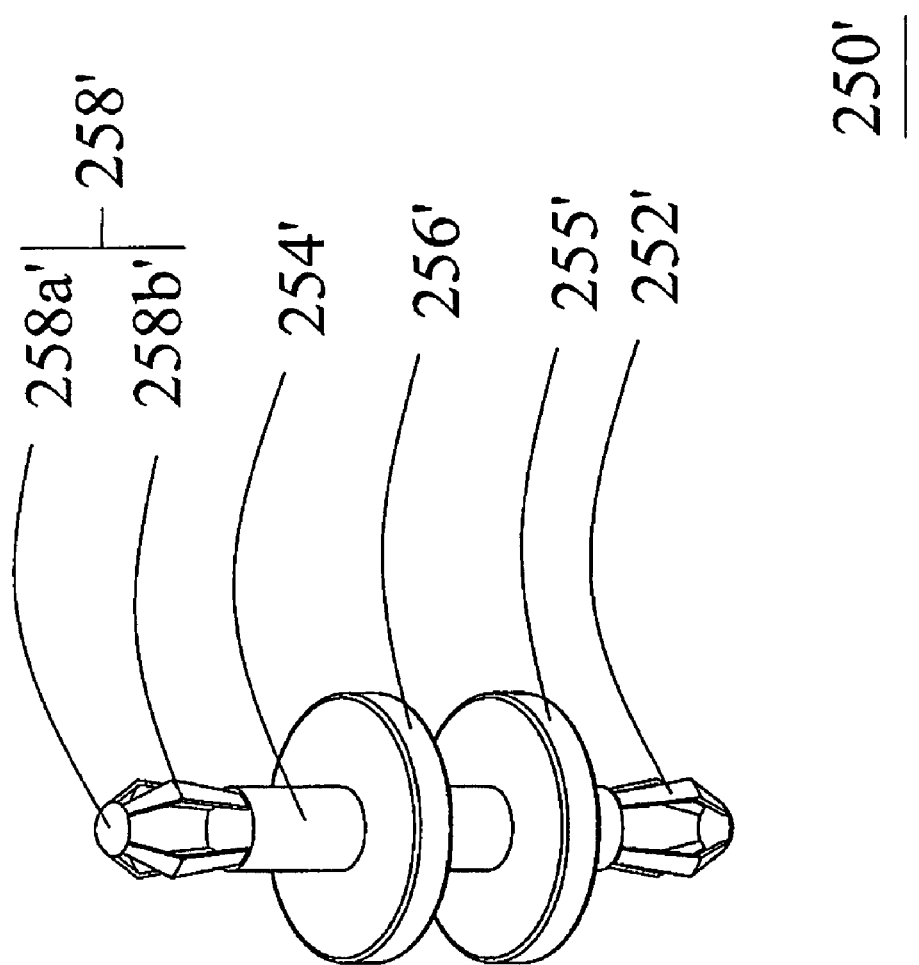
FIG. 5 is a perspective view of a needle according to FIG. 4.

Refer to FIGS. 4 and 5 for the second embodiment of the invention that show the backlight module and the needle. The needle 250' has a stem 254', a needle head 258' and a supporting portion 256'. The supporting portion 256' is located on the stem 254'. The needle head 258' is flexible. In the second embodiment, the needle head 258' has a holding plate 258a' and a plurality of warping blades 258b'. The warping blades 258b' bridge the holding plate 258a' and the stem 254'. The needle head 258' has a bottom spaced from the supporting portion 256' at a distance which is the same as the thickness of the second optical sheet 230. When the needle head 258' does not receive an external force, the needle head 258' has an outer diameter greater than the inner diameter of the hole 232 of the second optical sheet 230. As the needle head 258' is flexible and during assembly of the second optical sheet 230 by pressing the needle head 258', the second optical sheet 230 can be moved and held between the bottom of the needle head 258' and the supporting portion 256'. Moreover, when the external force is absent from the needle head 258', the outer diameter thereof is greater than the inner diameter of the hole 232 of the second optical sheet 230. Hence, an anchoring effect for the second optical sheet 230 is accomplished. Therefore, even if the position of the backlight module 200' is changed, the second optical sheet 230 does not loosen off.

Referring to FIGS. 4 and 5, the needle 250' may further include a base 255' and a tail end 252'. The tail end 252' is constructed the same as the needle head 258' and also is flexible. Moreover, the tail end 252' is spaced from the base 255' at a distance approximate to the thickness of the case 210. Hence, by applying a selected external force on the tail end 252', the needle 250' can be anchored on the bottom surface of the case 210.

In the first and second embodiments set forth above, the needles 250 and 250' are made from a transparent material, or the needles 250 and 250' and the supporting portions 256' may be coated with a reflective material on the surfaces thereof to increase utilization of the light sources 220.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

We claim:

1. A backlight module comprising:
a case;
a plurality of light sources located in the case;
a plurality of needles mounted onto a bottom surface of the case;
a plurality of supporting portions located on the plurality of needles;
a first optical sheet held by tops of the plurality of needles;
a second optical sheet located beneath the first optical sheet and held by the plurality of supporting portions, wherein the second optical sheet has a plurality of holes run through by the plurality of needles; and
a plurality of first microstructures located on the first optical sheet or the second optical sheet to converge light, wherein each of the needles has a stem and a needle head, with the plurality of supporting portions being located on the stem, with the needle head being flexible, with the needle head having a bottom spaced from the supporting portion at a distance which is the same as the thickness of the second optical sheet, and when the needle head is not receiving an external force, outer diameter of the needle head being greater than an inner diameter of the plurality of holes of the second optical sheet.

2. The backlight module of claim 1, wherein the plurality of needles and the plurality of supporting portions are coated with a reflective material.

3. The backlight module of claim 1, wherein the plurality of needles and the plurality of supporting portions are made from transparent materials.

4. The backlight module of claim 1 further having a plurality of latch elements which run through side walls of the case and each having one end pressing an upper surface of the second optical sheet.

5. The backlight module of claim 1, wherein the needle head includes a holding plate and a plurality of warping blades which bridge the holding plate and the stem.

6. The backlight module of claim 1, wherein the first optical sheet has a penetration rate greater than that of the second optical sheet.

7. The backlight module of claim 1, wherein the first optical sheet has a penetration rate lower than that of the second optical sheet.

8. The backlight module of claim 1, wherein the first optical sheet and the second optical sheet are made from materials selected from the group consisting of Polymethyl Methacrylate, Polycarbonate, Polystyrene, Methyl Methacrylate Styrene, Polypropene, Polythylene and Polythylene terephthalate.

9. The backlight module of claim 1, wherein the first microstructures are prisms.

* * * * *